P. B. & H. E. B. SCHADT.
TRANSMISSION MECHANISM.
APPLICATION FILED DEC. 20, 1909.
973,979.
Patented Oct. 25, 1910.
2 SHEETS—SHEET 2.
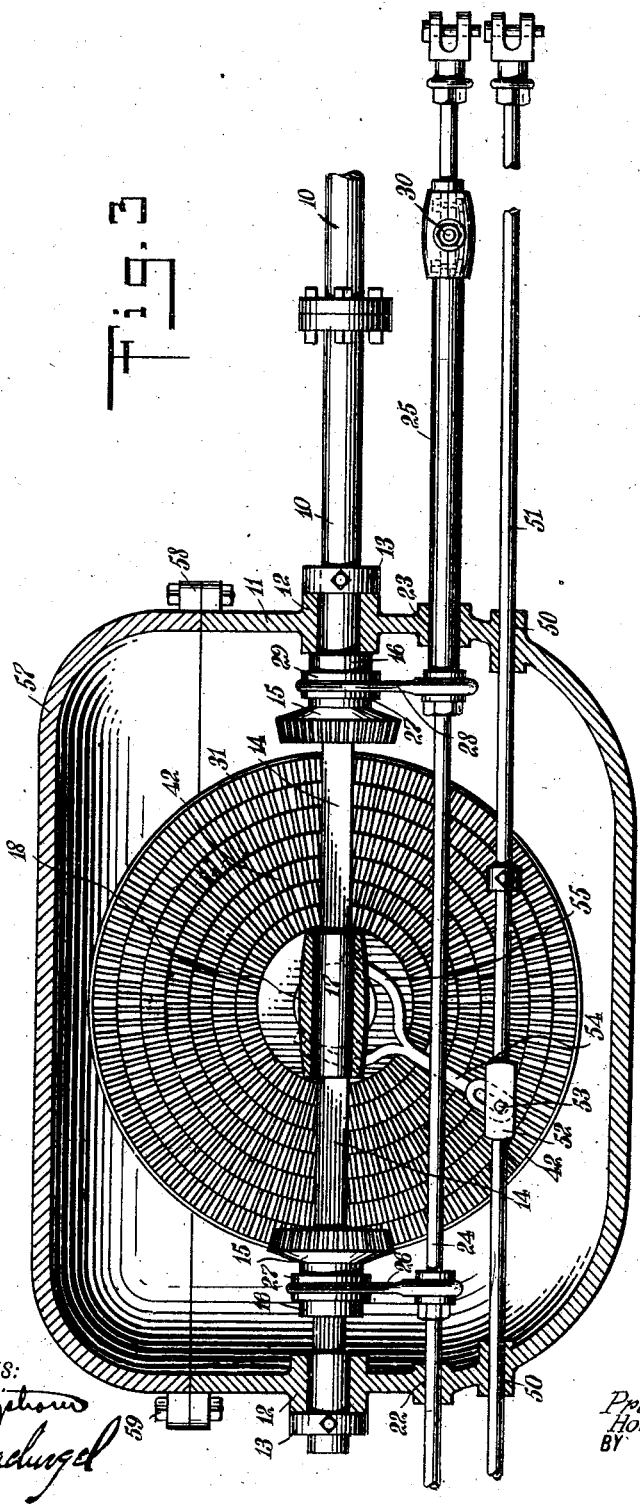
WITNESSES:
INVENTORS
Preston B. Schadt
Howard E. B. Schadt
BY
ATTORNEYS

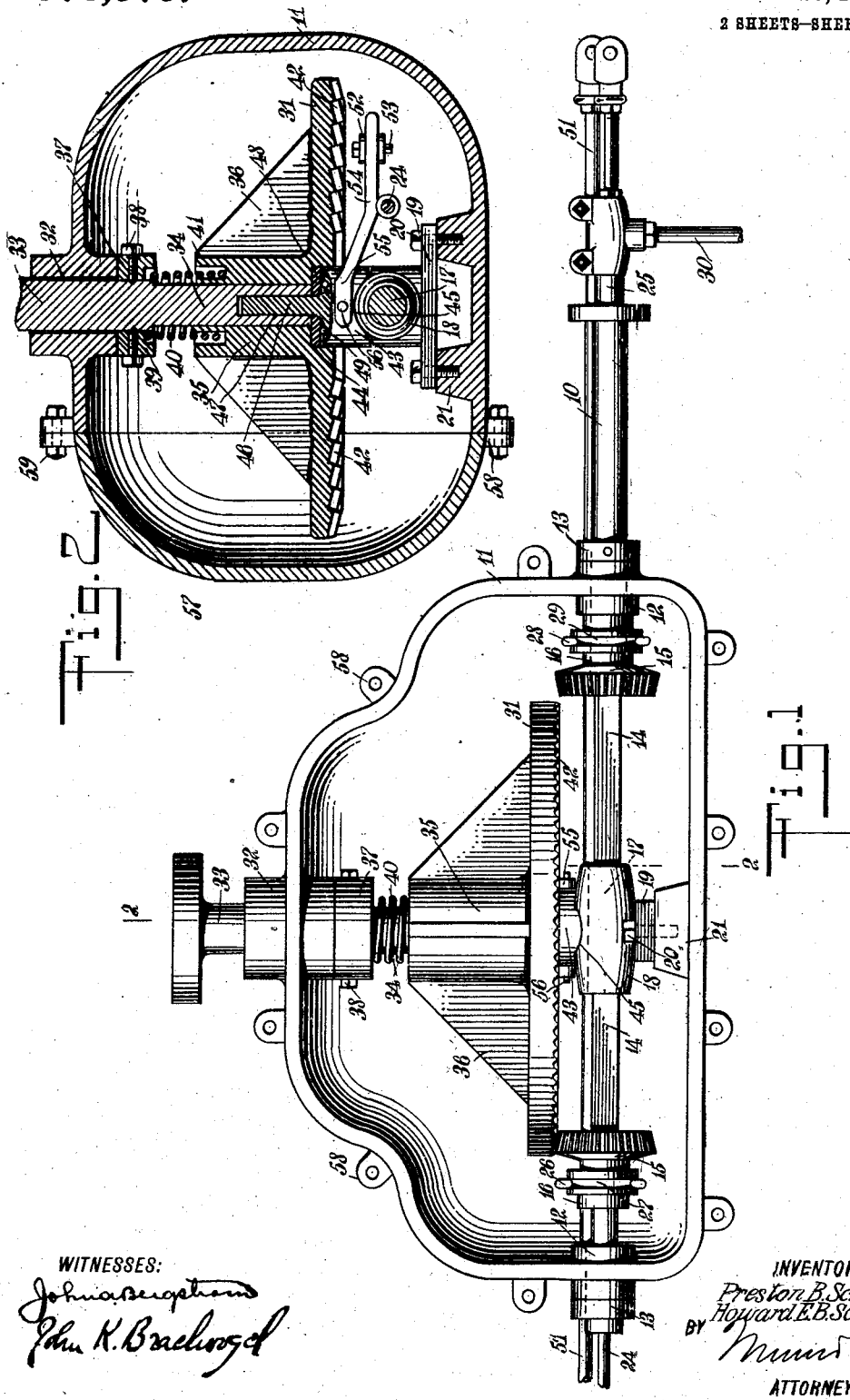

UNITED STATES PATENT OFFICE.

PRESTON B. SCHADT AND HOWARD E. B. SCHADT, OF ALLENTOWN, PENNSYLVANIA.

TRANSMISSION MECHANISM.

973,979.   Specification of Letters Patent.   Patented Oct. 25, 1910.

Application filed December 20, 1909. Serial No. 534,000.

*To all whom it may concern:*

Be it known that we, PRESTON B. SCHADT and HOWARD E. B. SCHADT, both citizens of the United States, and residents of Allentown, in the county of Lehigh and State of Pennsylvania, have invented a new and Improved Transmission Mechanism, of which the following is a full, clear, and exact description.

This invention relates to mechanisms for transmitting power developed by prime movers, to the driven members, and has reference more particularly to a transmission mechanism comprising a driving gear member, and a driven gear member adapted to mesh therewith, each of the members being rotatable and movable bodily.

The object of the invention is to provide a simple, economic and efficient transmission mechanism for use in motor-driven vehicles and the like, by means of which power can be efficiently transmitted from a prime mover to a driven axle or other member intended to be operated by the prime mover, which is capable of transmitting the power of the motor at a great variety of speeds, which can be reversed, which comprises few parts, and which is easily manipulated.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a plan view of an embodiment of our invention, part of the casing of the mechanism being removed; Fig. 2 is a transverse section of the mechanism on the line 2—2 in Fig. 1; and Fig. 3 is a longitudinal section of the device.

Before proceeding to a more detailed explanation of our invention, it should be clearly understood that while the transmission device is particularly useful in connection with motor-driven vehicles, it can also be advantageously employed for other purposes wherein it is necessary to employ variable speed transmission mechanism for operatively connecting the power-producing element and the element to be driven thereby.

Certain of the details of construction form no part of the invention and can be varied in accordance with individual preference and special conditions, without departing from the underlying spirit of the invention.

Referring more particularly to the drawings, we have shown for example, the driving shaft 10 which can be connected in any suitable manner with the prime mover, or may itself constitute the main shaft of the prime mover. We employ a suitable casing 11 having at opposite sides bearings 12 in which is journaled the shaft 10, the latter having suitable collars 13 which hold it against movement in the direction of its length. Within the casing, between the bearings 12, the driving shaft has spaced sections 14 of angular cross section, upon which are slidably mounted pinions 15 having openings therethrough of similar cross section, and provided with extensions or hubs 16. It will be understood that the pinions which are preferably tapered, are constrained to rotate with the driving shaft, though free to slide thereupon within the limits of the sections 14. Between the sections 14, the shaft has a part 17 of normal form and journaled in a rounded barrel 18 constituting a bearing and mounted upon a support 19, fastened by means of screws 20 or the like upon extensions 21 at the inside of the casing. The barrel 18 is of circular cross section and serves a purpose which will appear hereinafter.

The casing has opposite, registering openings 22 and 23 through which extends a shifting rod 24, substantially parallel to the driving shaft and arranged slidably within a tubular member 25 which extends movably through the opening 23. The rod 24 carries a shifting fork 26, the sides of which movably engage a grooved extension 27 of one of the pinion hubs 16. A similar, forked arm 28 is mounted at the inner end of the tubular member 25 and engages a grooved extension 29 of the hub 16 of the other pinion 15. The shifting rod is connected with suitable mechanism (not shown), by means of which it can be moved in the direction of its length. The tubular member 25 is likewise connected by means of a lateral rod 30, with mechanism (not shown), by means of which it can be manipulated in a similar manner.

We employ a gear disk 31, the plane of which is parallel to the axis of the driving shaft, and which is rotatable about an axis at right angles to the driving shaft. The casing has a bearing 32 in which is journaled a counter-shaft 33 constituting in the present embodiment of the invention, the driven member. The driven shaft 33 has a reduced extension 34 of angular cross-section, upon which is mounted the disk 31, the latter being provided with a hub 35 having an opening corresponding in form to the section 34. We have found it advantageous to provide strengthening flanges or webs 36 connecting the hub 35 and the disk 31. A collar 37 is fastened by means of set screws 38 or in any other suitable manner, upon the shaft 33 at the inside of the casing, engaging the bearing 32 and having at the inner face a groove 39, in which seats a spring 40. The latter also seats in a groove 41 formed at the end of the hub 35, so that the spring operates to force the disk longitudinally of the axis of the driven shaft, toward the pinions 15. The gear disk has the face adjacent to the pinions 15 provided with a plurality of concentric, annular gear sections 42, the teeth of which are inclined to the plane of the disk, and are adapted to mesh with the pinions 15.

We employ a thrust block 43 seating in a central depression or recess 44 of the disk and engaging the barrel 18. The thrust block has the face 45 adjacent to the barrel rounded, so that it fits snugly upon the barrel. It has a stem 46 movably arranged in a central opening 47 of the section 34 and encompassed by a roller ring or race 48, bearing rollers or balls 49 being positioned between the race 48 and the inner face of the thrust block, so that a thrust ball bearing is formed.

The casing has opposite registering openings 50 in which is slidably arranged a release rod 51 connected with mechanism (not shown), by means of which it can be moved in the direction of its length. The release rod 51 is parallel to the shifting rod and has an enlarged section 52 which is slotted, and between the sides of which is mounted by means of a pin 53, a slotted shifting lever 54 having a forked end 55 secured by means of suitable pins or the like 56, to the thrust block 43 so that the latter can be turned about its longitudinal axis when the release rod is moved in the direction of its length. This operation, as the curved face of the thrust block has a cam engagement with the curved barrel 18, causes the gear disk 31 to be moved in the direction of the length of its axis of rotation, either against or with the tension of the spring 40. In this way, by suitably operating the release rod, the gear disk can be moved into engagement with the pinions 15 and consequently, one or the other of the pinions can be moved from any one section of teeth 42 to an adjacent section, without difficulty, the operation being such that the gear members are first disengaged before the pinions are shifted. It will be understood that the direction of rotation of the driven shaft 33 depends upon which one of the pinions 15 is in mesh with the gear disk.

As the teeth of all the sections 42 are of the same size and pitch, the numbers of teeth in the sections differ. However, it is not possible to shift one of the pinions directly from one section to the other, while the members are in mesh. It is therefore necessary between the changes of speed, to disengage the driving member and the driven member. The shifting of the pinions is effected by means of the shifting rod 24 and the tubular member 25. The release rod 51 serves for moving the gear disk in the direction of the length of its axis of rotation, which places it out of mesh with the pinions.

The casing 11 has a removable portion 57, provided with ears 58, and is connected to similar ears on the main body of the casing, by bolts 59, as shown in Fig. 2.

Having thus described our invention, we claim as new, and desire to secure by Letters Patent:—

1. Transmission mechanism, comprising a driving shaft, a slidable gear thereon, a driven shaft having a collar and a part of angular section, a gear disk having a plurality of concentric gear sections, each adapted to mesh with said gear of said driving shaft, said gear disk having a hub provided with an opening corresponding to said part of said driven shaft and receiving the same, whereby said driven shaft is constrained to rotate with said gear disk, and said gear disk is movable longitudinally of said driven shaft, said hub having a groove, said collar having a groove, a spring upon said shaft and seating in said grooves, a thrust-block associated with said disk, a cam member engaging said block, whereby the rotation of said cam member moves said gear disk longitudinally of said driven shaft, means for shifting said gear of said driving shaft, and means for moving said cam member.

2. Transmission mechanism, comprising a driving shaft, a slidable gear thereon, a fixed, rounded member, a driven shaft, a slidable gear disk thereon adapted to mesh with said gear, a rotatable cam member engaging said fixed member and said gear disk and operable to move said gear disk longitudinally of said driven shaft, and a release rod having an operating connection with said cam member.

3. Transmission mechanism, comprising a driving shaft, a slidable gear thereon, a fixed, rounded member, a driven shaft, a slidable gear disk thereon adapted to mesh with said gear, a cam member engaging said fixed member and said gear disk and rotatable to move said gear disk longitudinally of said driven shaft, a release rod for operating said cam member, a thrust bearing between said gear disk and said cam member, and a rod for operating said gear.

4. Transmission mechanism, comprising a driving shaft, a pinion slidably mounted upon said shaft and constrained to rotate therewith, a driven shaft, a gear disk slidably mounted upon said driven shaft and constrained to rotate therewith, a spring forcing said gear disk toward said driving shaft, a fixed abutment member, a cam member in engagement with said abutment member, a thrust bearing between said cam member and said gear disk, a release rod for rotating said cam member to move said gear disk against the tension of said spring, and a rod for operating said pinion, said gear disk having a plurality of concentric gear sections each adapted to mesh with said pinion.

5. Transmission mechanism, comprising a driving shaft, pinions slidably mounted thereon and constrained to rotate therewith, a driven shaft, a gear disk slidably mounted upon said driven shaft and constrained to rotate therewith, said shafts being at an angle with each other, a spring normally forcing said gear disk toward said driving shaft and into mesh with one of said pinions, a casing encompassing said pinions and said gear disk, a slidable rod having an arm controlling one of said pinions, a hollow member having said rod slidable therein and having an arm controlling one of said pinions, and a release rod controlling said gear disk.

6. Transmission mechanism, comprising a driving shaft having parts of angular cross-section, pinions slidably mounted upon said parts, an operating rod having an arm controlling one of said pinions, a tubular member slidably receiving said operating rod, and having an arm controlling the other of said pinions, a driven shaft having a part of angular cross-section, a gear disk having a hub presenting an opening of angular cross-section receiving said part of said driven shaft, a spring engaging said hub and tending to force said disk toward said driving shaft, a fixed bearing receiving said driving shaft and having a rounded surface, a rotatable cam member having a rounded face engaging said rounded surface of said fixed bearing, a release rod, a lever operatively connecting said cam member and said release rod, a thrust bearing between said gear disk and said cam member, and a casing having openings slidably receiving said operating rod, said release rod and said tubular member, said gear disk having a plurality of concentric gear sections which adapt it to be engaged by said pinions.

In testimony whereof we have signed our names to this specification in the presence of two subscribing witnesses.

PRESTON B. SCHADT.
HOWARD E. B. SCHADT.

Witnesses:
HELENA M. SEIPLE,
HARRY E. TRUCHSES.